May 7, 1963    L. L. LITTLE    3,089,082
SWITCHING CIRCUITS
Filed Jan. 10, 1961    4 Sheets-Sheet 1
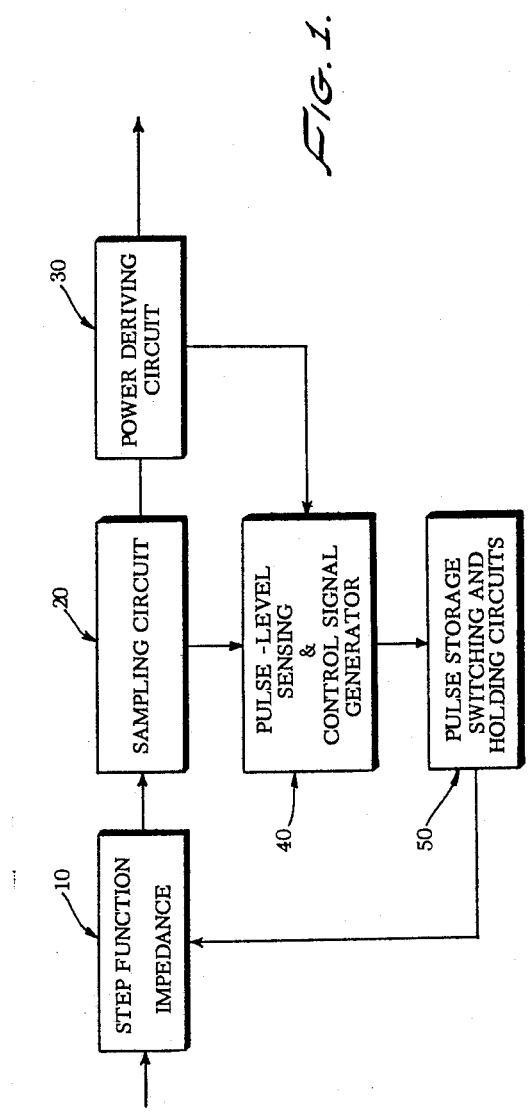
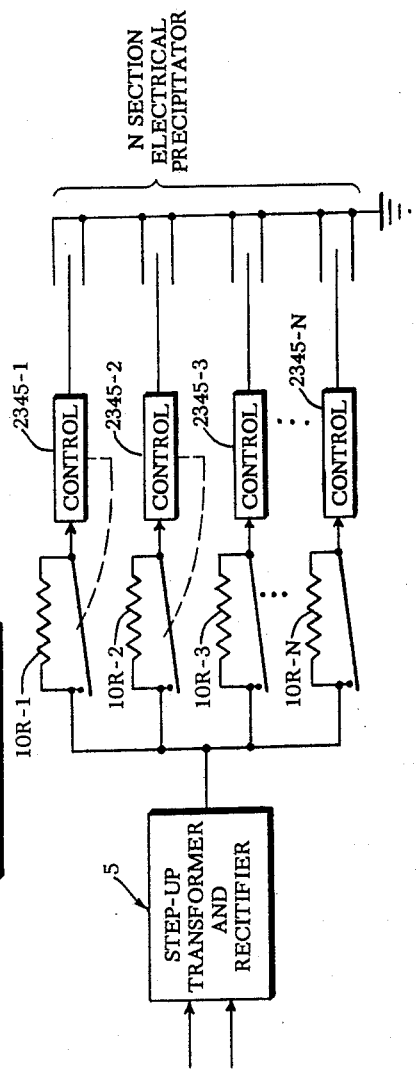
LARRY L. LITTLE
INVENTOR
BY
*Lester S. Hecht*
ATTORNEY

LARRY L. LITTLE
INVENTOR

May 7, 1963  L. L. LITTLE  3,089,082
SWITCHING CIRCUITS
Filed Jan. 10, 1961  4 Sheets-Sheet 3

LARRY L. LITTLE
INVENTOR

BY

ATTORNEY

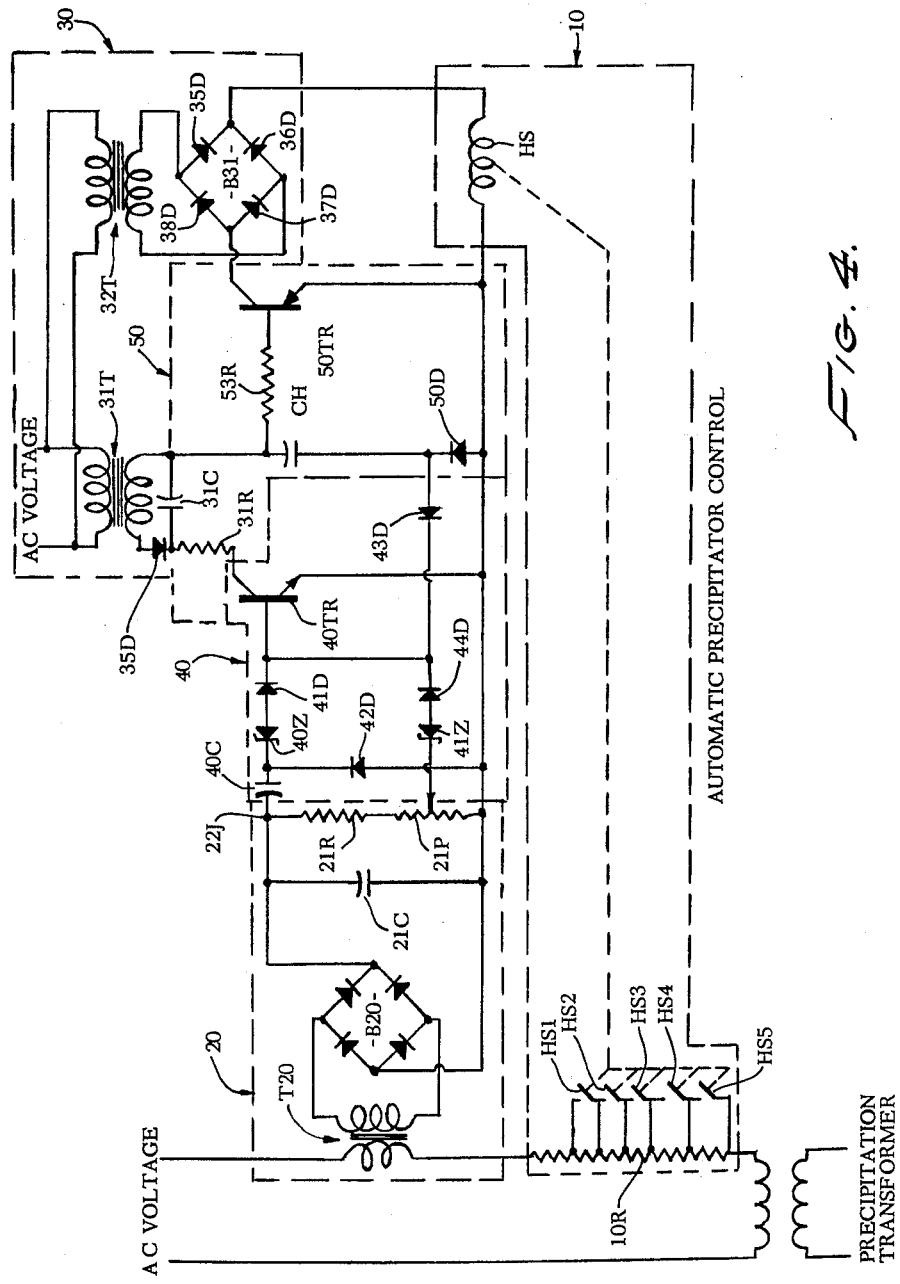

United States Patent Office 3,089,082
Patented May 7, 1963

3,089,082
SWITCHING CIRCUITS
Larry L. Little, Orange County, Calif.
(2574 Carnegie Ave., Costa Mesa, Calif.)
Filed Jan. 10, 1961, Ser. No. 81,785
3 Claims. (Cl. 323—66)

This invention relates to power switching circuits and more particularly, to a power switching circuit for an electrostatic precipitator which is arranged to distribute power among a plurality of precipitator sections according to the needs of each, in order to avoid excessive power input to some sections and insufficient power input to other sections.

While the present invention may have general application for use as a power switch, the particular concentration herein will relate to the problems of the precipitator industry. It will be understood, of course, that our particular problem concentration does not limit the scope of the invention in any way and is intended solely as a convenient means of exemplifying the invention.

In the electrical precipitation industry it is customary to connect several precipitator sections to one high voltage transformer-rectifier combination. This is done because one large electrical set is much less expensive than several small sets of the same total capacity. Maximum precipitator collection efficiency is then obtained when each precipitator section receives the maximum voltage and current it can absorb without excessive interelectrode sparking. Since there are substantial differences in clearances and gas and particulate distribution in the various sections, the above practice results in excessive power input to some sections and insufficient power input to other sections.

It is one general purpose of the present invention to provide a power switching device which will automatically reduce the power input to a precipitator section after a predetermined frequency of occurrences of sparks or other electrical disturbances have been detected along the particular section line, and to then hold this section on a reduced power supply operation until the spark disturbances have returned to a normal level of frequency and amplitude for a predetermined period of time.

In its general structural form the invention comprises a step-function impedance which receives the power to be transmitted to a particular precipitator section. The output end of the step-function impedance is coupled to a sampling circuit which is sensitive to the electrical disturbances caused by the precipitator or other power deriving circuit. The sampling circuit provides input signals for a circuit which senses the pulse level of the input signals and is also sensitive to the frequency of occurrence of these signals and produces control signals.

The control signals are then applied to switching and holding circuits which are arranged to cause the actuation of the step-function impedance to its reduced power position or state as soon as the level and frequency of the disturbances cause excessive power to be drawn to the particular precipitator section or other power deriving circuit. The switching and holding circuits also include means for holding the step-function impedance in the reduced power state until sufficient time has elapsed to insure that the disturbances will no longer cause the excessive power drain.

The preferred arrangements of the invention described in particular detail herein have several subcombination features which may have other applications, although their immediate function is in the total power controlling combination. In one arrangement, a single transistor is employed in dual function to develop a switching signal in response to spark disturbances and after this fast-time-constant function also serves to provide a slow-time-constant discharge path for the holding function of the switching operation. Thus this single amplifier device serves to sense the rapid pulsing of the disturbances and to build up a signal on a storage capacitor CS at a very fast rate, and then to provide a slow discharge path for a holding capacitor CH.

The invention also contemplates a novel type of mechanical amplification to achieve the switching required to change the impedance at the input rapidly, in response to the signal developed across capacitor CS, but with a minimum of solenoid switching energy. This is accomplished by causing the bowing of a transfer element referred to as PS so as to cause the immediate reduction of the magnetic holding force causing opposite contact pressure. Many other features which may have general application where high speed switching is desired with a longer period for return, will be discussed when the invention is considered in detail below.

In another arrangement of the invention the step-function impedance is controlled as a continuous function of the disturbance signals to introduce various degrees of impedance according to the level of the disturbance signal. In a particular form this may be accomplished through the use of a rotary type of solenoid, or a linear solenoid mounted on a pivot, with a plurality of switch contacts, each arranged to open to introduce a respective impedance increment for a different level of the disturbance signal.

The continuous function arrangement just mentioned may use a sampling and pulse level sensing circuit similar to the single step arrangement mentioned above or may introduce other circuits for accomplishing both voltage and current control over the impedance level, and additional amplification stages to provide the gain required for the step-function impedance control.

The generic feature of the invention is the feature of disturbance signal sensitivity with automatic control for impedance variation and for maintaining the impedance change, and provision for retention of the impedance change until the rate and level of disturbance signals are noted to have fallen below the critical level for a predetermined period of time. In the case of the multilevel impedance control the holding function after impedance change is an inherent function in the type of solenoidal control. In the single step function case special capacitor circuits provide the actuation and holding functions.

Accordingly, it is a general object of the present invention to provide an improved power switch for changing the input impedance to a load, such as a precipitator section, when sparks or other electrical disturbances cause the load to draw excessive power, in order to reduce the power drain, and to provide the return switching when the disturbance is noted to have been sufficiently reduced or eliminated.

Another object of the invention is to provide an effective means for providing a high-speed switching control signal as a function of the detection of electrical disturbances and for then providing a slow-speed switching control signal indicating the reduction or elimination of the disturbance.

A further object of the invention is to provide an improved arrangement for changing the input impedance to a load subject to electrical disturbances.

Still another object of the invention is to provide a switching device which may be employed as a power equalizing device for a plurality of electrostatic precipitators.

A specific object of the invention is to provide a pulse-level sensing and control signal generator circuit for translating electrical disturbance signals into a first control signal indicating the presence of disturbances occurring at a certain minimum amplitude and certain minimum rate.

Another specific object of the invention is to provide a two-way or dual functioning transistor circuit for providing a fast-time constant charging circuit for a switching capacitor and a slow-time constant discharging circuit for a holding capacitor.

A further specific object of the invention is to provide an improved power switching device where an effective amplification of a switching solenoids action is accomplished by causing the bowing of a transfer element at the beginning of a switching operation.

Still another specific object of the invention is to provide an economical and efficient circuit arrangement for actuating a switching solenoid SS and a holding solenoid HS to change the position of a transfer element PS.

The novel features which are believed to be characteristic of the invention, both as to its organization and method of operation, together with further objects and advantages thereof will be better understood from the following description considered in connection with the accompanying drawings. It is to be expressly understood, however, that the drawings are for the purpose of illustration and description only and are not intended as a definition of the limits of the invention.

FIG. 1 is a block diagram of the basic combination of the invention;

FIG. 3 illustrates the manner in which a plurality of combinations of the type of FIG. 1 may be employed for automatic power equalization among a corresponding plurality of precipitator sections; and FIG. 4 illustrates a continuous type of impedance control according to the invention.

Figure 2:
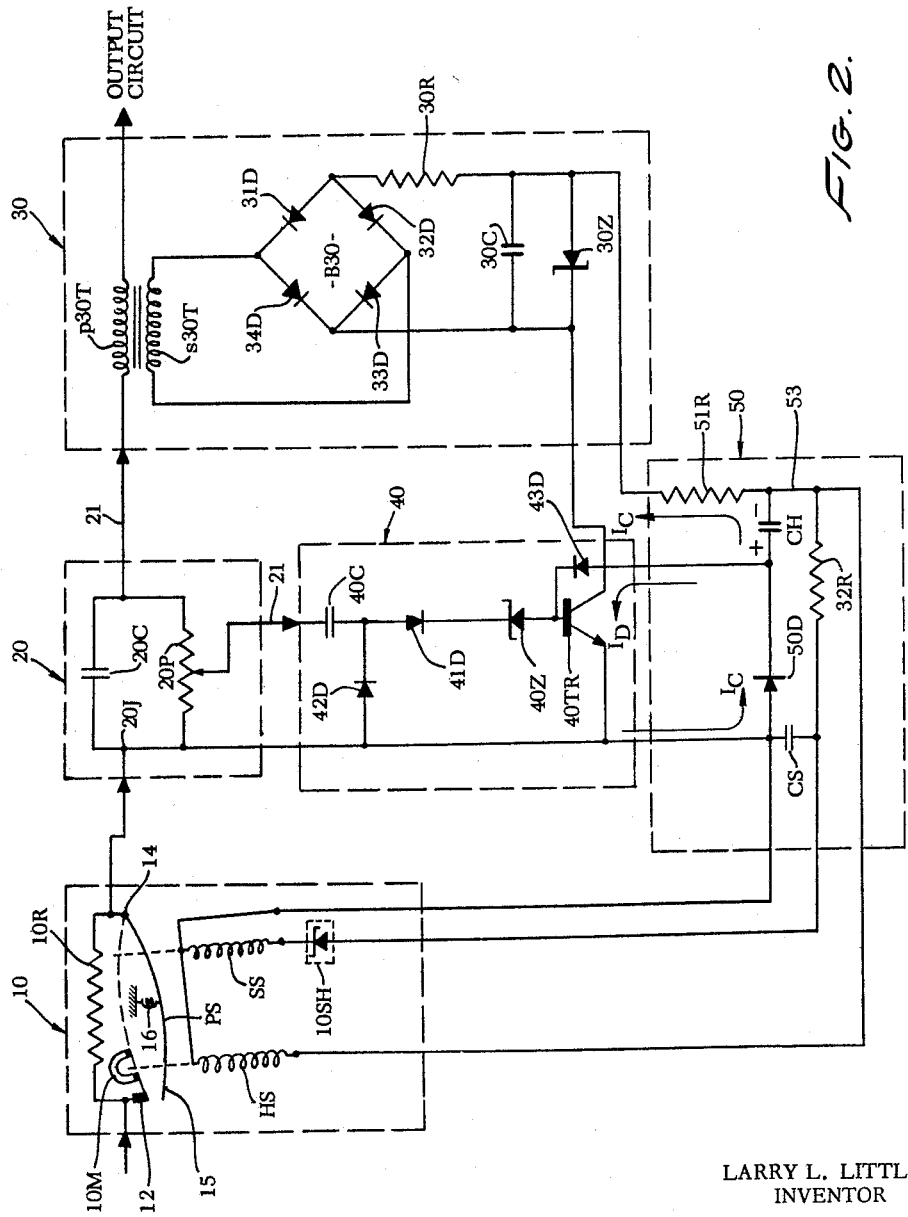
FIG. 2 is a schematic diagram of a suitable arrangement of the combination of FIG. 1.

Reference is now made to FIG. 1 wherein it will be noted that the power input line is applied to a step-function impedance 10. Impedance 10 is connected in series with a sampling circuit 20 and power deriving circuit 30 providing an output signal.

The sampled signal of circuit 20 is applied to a pulse-level sensing and control signal generator circuit 40 which receives its operating power as a derivative of the signal developed across circuit 30.

Circuit 40 functions to translate the sampled signals into control signals for actuating switching and holding circuit 50. In one embodiment of the invention this includes two storage capacitors for developing the necessary switching and holding time constants, in the other illustrated herein the switching and holding functions are obtained through a single storage capacitor.

The general principles of the basic embodiment of the invention shown in FIG. 1 will be better understood after describing the preferred schematic arrangement of FIG. 2. It will be understood, however, that the system aspects of the invention are not limited to the particular circuit features which will be introduced in the discussion related to FIG. 2.

In the arrangement of FIG. 2, step-function impedance 10 is noted to include a power resistor 10R which may also constitute a precipitator power resistor for the illustrative application of the invention shown in FIG. 3. Resistor 10R is shunted by a transfer element PS. The normally closed position of element PS is shown in dotted lines and will be noted to be bowed with the center higher than the contact point 12 and the pivot point 14. The solid representation of element PS indicates its appearance as it is transferred to the holding position by the action of solenoid SS.

The operation of circuit 10 is to translate a switching signal applied to a four-layer semiconductor device 10SH, which may be of the Shockley 4-layer type, into a switching signal—after the semiconductor device provides a circuit closure to solenoid SS—which causes the transfer of transfer element PS to the holding position where solenoid HS is operative. Solenoid HS is then held as a function of a second switching signal until the electrical disturbances which caused the initial actuation of SS have been sufficiently reduced or eliminated.

The normal or closed position of element PS is maintained by a holding magnet 10M which creates contact pressure at contact 12. This contact pressure is substantially reduced at the beginning of a switching operation by the bowing action caused by the torque of solenoid SS. This makes it possible for a small rotary solenoid SS to cause the switching in spite of the fact that holding magnet 10M may hold the element PS closed with considerable contact pressure under normal conditions. This feature of the invention will be discussed again after the other circuit features of the switching arrangement of FIG. 2 have been introduced.

The output signal derived through impedance 10 is applied to the junction 20J between a capacitor 20C and a potentiometer 20P in circuit 20. One output lead 21 provides a signal for power deriving circuit 30. In particular, the signal on lead 21 is applied to the primary winding p30T of a transformer 30T, the other end of which provides the output circuit connected to a suitable load which may be a precipitator section.

The secondary s30T of this transformer has one end connected to a bridge circuit B30 including diodes 31D, 32D, 33D and 34D. The cathode of diode 31D and the anode of diode 34D are connected to the secondary s30T, and the anode of diode 32D is connected to the anode of diode 31D, while the cathode of diode 33D is connected to the cathode of diode 34D. This constitutes a conventional bridge rectifier circuit with the junction between the cathode of diode 32D and the anode of diode 33D being connected to the other end of the secondary s30T. While the bridge is conventional, the technique of deriving the switching power from the main line voltage in this manner is one of the features of the invention making it possible to accomplish the desired function without a costly high voltage isolation transformer.

The cathodes of diodes 33D and 34D are connected to a filter circuit including a capacitor 30C in parallel with a Zener breakdown diode 30Z, used for regulating purposes in a conventional manner. The other end of the filter circuit is connected through a resistor 30R, constituting a current limiting resistor, to the anodes of diodes 31D and 32D connected together.

The output signal developed in circuit 30 at the cathodes of diodes 33D and 34D across the filter circuit including capacitor 30C and Zener diode 30Z provides the B+ power for the collector electrode of a transistor 40TR in circuit 40.

The input signal for the base electrode of transistor 40TR is derived through a circuit including an input D.C. blocking capacitor 40C, a diode 41D arranged to pass positive pulses to a Zener diode 40Z coupled to the base of transistor 40TR.

A second diode 42D is shown to provide an effective voltage doubling circuit connected across capacitor 40C. Capacitor 40C is connected to the variable tap of potentiometer 20P so that the amount of the electrical disturbance to be sampled and applied to Zener diode 40Z, through diode 41D, may be adjusted as desired. Zener diode 40Z is selected so as to assume a conducting condition after a predetermined voltage develops across it, and is used to block the steady state ripple voltage that would otherwise pass through capacitor 40C. In a typical case this may be 10 volts.

The breakdown of Zener diode 40Z provides input current for transistor 40TR which causes amplified current to flow in the collector-emitter circuit thereof. This current is effective to cause the charging of holding capacitor CH through a diode 50D, both of these elements being shown as part of circuit 50 which develops the switching and holding signals for actuating circuit 10.

Figure 2A:
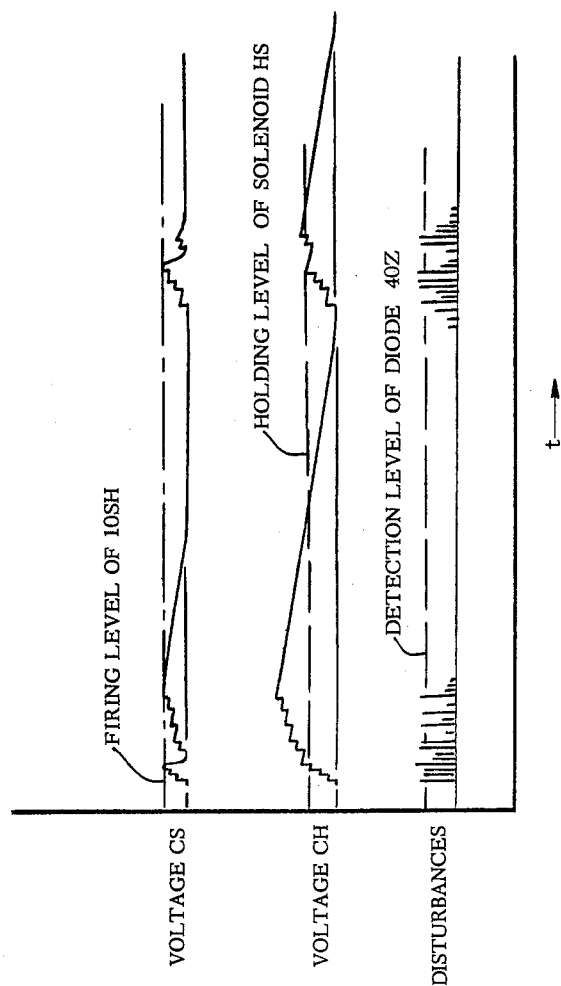
FIG. 2A is a composite set of waveforms illustrating a typical operation of the circuit of FIG. 2.

The collector-emitter current which charges capacitor CH is referenced as Ic in FIG. 2, and is effective as shown in FIG. 2A to cause an increase of voltage across capacitor CH. As the voltage is increased across capacitor CH it is also caused to increase across switching capacitor CS. If the disturbance pulses are of sufficient amplitude to cause Zener diode 40Z to break down and supply current to transistor 40TR, the charging of capacitors CH and CS continues, with discharging occurring between disturbances through the base-to-emitter path of transistor 40TR from the plus (+) side of capacitor CH and diode 43D, through holding solenoid HS, to the minus (—) side of capacitor CH. This discharge time constant is much larger than the charging time constant during pulses since the collector-emitter path supplies an amplifier current.

Thus if the pulse disturbances occur at amplitudes sufficient to cause the breakdown of Zener diode 40Z, and at a rate greater than the relatively slow discharge rate for capacitor CH, capacitor CS will receive enough charge by transfer from CH to cause the break down of the Shockley 4-layer diode 10SH which permits actuation of solenoid SS.

This then causes the bowing of transfer element PS and the movement of this element to the holding position where it is held by the holding solenoid HS.

If reference is made again to FIG. 2A it will be noted that the occurrence of a group of disturbances which exceed the detection level of 40Z and cause the firing of solenoid SS through Shockley diode 10SH occurs very rapidly in view of the relatively short time constant for the charging circuit for capacitor CS. This capacitor is then discharged through solenoid SS when it is actuated, but the charging of capacitor CH continues as long as pulses exceed the detection level.

Capacitor CH then begins its long time constant discharge through the base-emitter path of transistor 40TR when pulses fail to reach the detection level, but holding solenoid HS does not permit the return of transfer element PS—through the action of a spring return 16— until the level of the voltage across HS falls below the holding level shown in FIG. 2A.

A second switching operation occurs in response to a subsequent group of disturbances which again exceed the detection level.

From the description thus far several novel features of the invention should be evident. The control signal generating circuit has been shown to operate without a separate power supply, the necessary B+ power being derived from circuit 30 which may also supply the load such as a precipitator section. The arrangements of circuits 40 and 50 has the unique feature of sharing the same transistor for charging and discharging at different rates to establish both a fast-time-constant switching operation whereby energy is transferred to capacitor CS, and a slow-time-constant switching operation where capacitor CH discharges through the base emitter path of the same transistor.

Another important feature which has been described is the arrangement of circuit 10 whereby a relatively small amount of energy from rotary solenoid SS is effective to break the holding action of magnet 10M. This is accomplished by the initial action of the torque created by SS in moving point 15 on transfer element PS away from the holding magnet 10M due to the bowing action represented by the difference between the normally closed dotted position and the actuated position shown in the solid line. This then permits SS to gain the effective mechanical amplification of the lever arm from pivot 14 to the point 15 for the initial break with magnet 10M. In this manner, the SS solenoid need only receive a short burst of current as shown in FIG. 2A to break with the holding magnet 10M and then very little energy is required to transfer element PS to the holding position.

The general technique of using the invention in an N-section precipitator arrangement is shown in FIG. 3. Here each power switch is shunted by a respective resistor 10R-1 ... 10RN. Each resistor is controlled in the same manner as previously described with respect to circuit 10 of FIG. 2.

Control circuits 2345-1 ... 2345-N may each be similar to the combination of circuits 20, 30, 40 and 50 of FIGS. 1 and 2. In operation, then, the impedance to each section of the precipitator is adjusted by the respective step-function input impedance to compensate for changes in precipitator section impedance caused by dust accumulation on the electrodes or other factors which may cause excessive sparking.

Reference is now made to FIG. 4 where another arrangement of switching circuit appropriate for controlling a precipitator in the manner discussed above is shown in schematic detail. In this system disturbances detected in an A.C. voltage line are sampled through an input transformer T20, forming part of sampling circuit 20. The secondary winding of transformer T20 is connected across a bridge circuit B20 operating to provide full-wave rectification of all signals detected.

Bridge circuit B20 produces an output signal which is filtered through capacitor 21C and resistor 21R connected in series with potentiometer 21P. A capacitor 40C, having the same function as the capacitor of the same reference symbol shown in circuit 40 of FIG. 2, is connected to junction 22J and applies pulse signals to Zener diode 40Z providing the pulse level sensing function discussed above. The anode of diode 40Z is connected to diode 41D which passes signals exceeding the level of discrimination of diode 40Z to transistor 40TR. All elements having previously used reference symbols have the same function mentioned above.

Diode 42D is again present to accomplish voltage doubling. An additional sampling circuit is found in the series connection of Zener diode 41Z and diode 44D coupling the variable tap connection to potentiometer 21P to the base of transistor 40TR. This provides a current sampling circuit where current exceeding a predetermined level will cause the breakdown of diode 41Z and pass current through diode 44D to transistor 40TR. Thus either current disturbances or current exceeding predetermined levels may be employed to develop impedance control signals.

Transistor 40TR functions as before to charge capacitor CH through its collector-to-emitter path and diode 50D. The dual transistor function is present again since a fast time constant charge path is present through the collector-emitter path with the transistor gain working, and a slow time constant discharge path is provided through diode 43D and the base to emitter path of the transistor.

The system of FIG. 4 is a continuous one in terms of the control effected since the signal developed across capacitor CH is continuously translated through a second transistor amplifier 50TR into a control signal for shorting out successive increments of an impedance 10R according to the level of input signal detected.

Capacitor CS, Shockley diode 10SH and switching solenoid SS are not required since the level detection is accomplished as a function of the amount of current required to actuate various contacts associated with a single solenoid as is discussed further below.

In particular, it will be noted that the minus (—) end of capacitor CH is coupled through resistor 53R to the base of second transistor 50TR, which has its collector-emitter path in series with solenoid coil HS. The power supplies for both transistors are independently obtained through transformers 31T and 32T. B+ is obtained from 31T, half wave rectifier diode 35D, and is filtered through capacitor 31C passing through a load resistor 31R to the collector of transistor 40TR. Full wave rectification is made of the B— obtained through transformer 32T via bridge circuit B31 consisting of diodes 35D through 38D arranged to provide minus potential for the collector of transistor 50TR which is of the PNP type.

The emitter-to-collector current of transistor 50TR is controlled as a direct function of the disturbance signals stored in capacitor CH and thus the current passed to solenoid coil HS measures the degree of disturbance. This degree of disturbance is translated into an incremental impedance change via the action of contacts HS1 through HS5. It will be understood, of course, that any number of contacts HS may be employed. These contacts are arranged to be normally closed when the current through transistor 50TR is at a minimum. Each time the current passes through a detection level another contact is opened until all contacts are opened to introduce the maximum impedance for the heaviest disturbance condition. For example, the first level of disturbance would cause contact HS1 to open to introduce its corresponding impedance increment into series with the input A.C. voltage, the next disturbance level would cause both contacts HS1 and HS2 to be opened, the next to open contacts HS1, HS2, and HS3, and so forth.

From the foregoing description it should now be apparent that the present invention provides an effective and an efficient method for adjusting the operating characteristics of a system to compensate for changing conditions of electrical disturbance. In particular, it has been shown that a precipitator may have its voltage adjusted according to the rate and amplitude of electrical disturbances and maximum desired steady state current, and that provision may be made for holding the transient or steady state current adjustment for a period determined as a function of the rate of discharging time of capacitor CH.

The invention has been illustrated in two basic circuit forms. In one a single step-function impedance is employed, in the other a continuous impedance control is effected. In both instances the feature of a dual transistor operation is present whereby a fast time constant charge and a slow time constant discharge into a single capacitor CH are accomplished with a single transistor. In one case the feature of deriving the power from the precipitator power line was illustrated and in the other case the feature of the dual amplification to derive a continuous solenoid switching function through a plurality of contacts was illustrated.

It will be understood, of course, that many other variations are possible without departing from the generic spirit of the invention which contemplates the use of the novel type of transistor function to develop level detection for current or voltage disturbances, such detection then being used to develop a stored signal employed for switch control. The switch control is employed to change the circuit characteristic to compensate for the electrical disturbance.

The invention has been considered with particular reference to the precipitator problem, but many other uses are possible and many other forms of control may be accomplished with the techniques disclosed herein. For example, in place of a resistive impedance variation, the invention may be used with inductive or capacitive variations or mixtures thereof. Instead of impedance control it may be desired to effect a direct voltage switching control or a current switching control, without the introduction of a series impedance. In this case the invention provides the controllable selection means for directly applying the desired voltage or current.

Accordingly, the scope of the invention herein broadly encompasses those devices falling within the generic terminology of the appended claims.

I claim:

1. A system for automatically adjusting the impedance in series with a load in order to compensate for electrical disturbances in the load which reach a predetermined level and frequency of occurrence, said system comprising: first means in circuit with the load for detecting electrical disturbances which exceed said predetermined level; a transistor having base, emitter and collector electrodes for receiving said detection output signal of said first means at its base electrode; a storage capacitor coupled to the collector-to-emitter path of said transistor; means in circuit with said transistor for providing a relatively fast rate of charging for said capacitor through the relatively low impedance collector-to-emitter path of said transistor; means in circuit with said transistor for providing a relatively slow discharging for said capacitor through the relatively high base-emitter path through said transistor; and means responsive to the signal which is stored in said capacitor for producing an impedance control signal.

2. The system defined in claim 1 wherein in addition to the signal which is stored in said capacitor means is provided for developing a firing signal, said last named means including a second capacitor in circuit with said first capacitor and coupled through means adapted to transfer a predetermined amount of the charge of said first capacitor to said second capacitor, and further includes means responsive to the firing signal developed in said second capacitor for changing said impedance control signal.

3. A system for increasing the impedance with a precipitator power supply after a predetermined level and frequency of occurrence of electrical disturbances have been detected in the circuit path between said power supply and the load of said precipitator, said system comprising: a single step impedance with a transferrable shunting contact connected for pivoting about one end of said impedance, with a permanent magnet arranged to hold said contact to shunt out said impedance; a sampling circuit for detecting said electrical disturbances; a level detection circuit for producing detection signals whenever electrical disturbances are detected which exceed a predetermined level; a charging circuit for developing a signal corresponding to the approximate integral of those electrical disturbances which exceed said predetermined level; a discharging circuit for reducing said integral signal at a predetermined rate to cause a resultant signal which assumes a level corresponding to the number of disturbances which occur within a predetermined time interval; and control means responsive to said resultant signal for actuating said single step impedance by actuating said contact by a torque nearer said pivot than the location of said permanent magnet to cause the bowing of said contact.

References Cited in the file of this patent

UNITED STATES PATENTS

| | | |
|---|---|---|
| 2,297,740 | Brown | Oct. 6, 1942 |
| 2,675,092 | Hall | Apr. 13, 1954 |
| 2,925,142 | Wasserman | Feb. 16, 1960 |
| 2,943,697 | Little | July 5, 1960 |